United States Patent
Yuschak et al.

(10) Patent No.: US 6,481,204 B1
(45) Date of Patent: Nov. 19, 2002

(54) EXPANSIBLE POLYMER CLAMPING DEVICE

(75) Inventors: Thomas D. Yuschak, North Royalton, OH (US); Edward T. Schneider, Eastlake, OH (US)

(73) Assignee: TCAM Power Workholding, LLC, Mentor, OH (US)

( * ) Notice: Subject to any disclaimer, the term of this patent is extended or adjusted under 35 U.S.C. 154(b) by 0 days.

(21) Appl. No.: 09/897,846

(22) Filed: Jul. 2, 2001

(51) Int. Cl.$^7$ ............................................. F01B 29/10
(52) U.S. Cl. ............................................ 60/527; 60/530
(58) Field of Search ........................... 60/527, 528, 530, 60/531

(56) References Cited

U.S. PATENT DOCUMENTS

| | | | |
|---|---|---|---|
| 4,815,491 A | * 3/1989 | Prikle | 137/62 |
| 5,025,627 A | 6/1991 | Schneider | 60/527 |
| 5,177,969 A | 1/1993 | Schneider | 60/527 |
| 5,419,133 A | 5/1995 | Schneider | 60/527 |
| 5,685,149 A | 11/1997 | Schneider et al. | 60/528 |
| 5,720,169 A | 2/1998 | Schneider | 60/530 |
| 5,822,989 A | 10/1998 | Sturdevant et al. | 60/528 |
| 6,275,320 B1 | * 8/2001 | Dhuler et al. | 359/237 |

* cited by examiner

*Primary Examiner*—Hoang Nguyen
(74) *Attorney, Agent, or Firm*—Fay, Sharpe, Fagan, Minnich & McKee, LLP

(57) ABSTRACT

A clamping device includes an expansible polymer that is disposed in a polymer chamber (14). A heat transfer conduit (22) transports heat transfer fluid and brings it into thermal conductivity with the polymer. By cooling or heating the polymer as needed, the polymer expands and contracts as it melts and freezes, respectively. The volume change of the polymer is used to advance a piston (16). The piston is used to engage upon a surface, e.g., clamp a machine part. In this manner, the surface is disposed between the actuated piston (16) and an immobile plate, causing the surface to become rigidly held in position. When the piston (16) contacts the surface, pressure builds in the polymer chamber(14), which translates into clamping force on the surface.

27 Claims, 6 Drawing Sheets

EXPANSIBLE POLYMER CLAMPING DEVICE

BACKGROUND OF THE INVENTION

The present invention relates to the mechanical clamping arts. It finds particular application in conjunction with securing assembly parts in a factory or mill setting and will be described with particular reference thereto. It will be appreciated, however, that the invention is also applicable to other settings and is not limited to the aforementioned application.

Mechanical clamps have a very wide range of applications in the manufacturing industry. Generally, application of clamping devices can be divided into three main classes. First, clamps are used to secure parts that are being worked upon, such as machined, formed, stamped, etc. Second, clamps are used to clamp various machine parts into a locked position within a manufacturing tool. Third, clamps are used to position machine tool components for operations they are meant to perform. Some examples of these devices that are generally known as clamps are machine vises, fixture clamps, lathe chucks, tool holders, drill feed units, electrical discharge machining (EDM) electrode feed units, weld wire feed units, and others.

One method of clamping which can be generically applied to any of the aforementioned devices is mechanical clamping. These devices include screw clamps, over center cam devices, and wedges. They are manually applied with levers or tools such as socket wrenches or air guns. The manual opening and closing of these clamps creates direct labor and extra mill downtime. Additionally, such workers are at risk for repetitive task related injuries.

Hydraulic systems are frequently used to operate clamps. Hydraulic systems have the benefits of being remotely operated, and having very high clamping pressures. However, hydraulic systems have a relatively high failure rate. Leaks, damaged o-rings, fittings, and hoses create situations of long down-times and high repair costs. Leaking hydraulic fluid can be hazardous to those who come into contact with it, making clean-up necessary, and dangerous if not handled properly. Oil leaks from hydraulic systems can contaminate cutting fluids, causing potential health problems when the fluids are vaporized by cutting blades. Moreover, hydraulic systems experience wear when torn down and built up, such as when arranging a shop to machine different goods. If a machine shop changes its output product often, the hardware degrades more quickly.

In hydraulic systems, the supply hoses are at pressure when the system is actuated. These stresses on the hoses often cause them to warp and bend in unwanted directions. In an automated mill, such a situation can present a catastrophic problem. If a hose becomes warped such that it gets in the path of an automated mill part, the automated part can tear the hydraulic hose causing loss of clamping force and leakage of hydraulic fluid. Both results present dangerous situations to mill workers.

Pneumatic devices are also known in the art as an option for operating clamps. Pneumatic systems are beneficial because production is not halted to repair minor leaks. Typically, pneumatic systems run in shops constantly hiss, and spit, indicative of damaged o-rings and minor leaks. However, pneumatic systems also have their share of setbacks. Noise levels generated by pneumatic systems often exceed OSHA limits. Typical pneumatic systems are low pressure systems not suitable for machining. Pneumatic clamps, as a result can have a compressibility that is undesirable. Moreover, pneumatic systems can release oil-laden air, which is a potential health risk.

Electric motors are also known, but are relatively poor for generating a static, clamping force. They are relatively massive, require extensive electronic packages, and are costly to operate.

The present invention provides a new and improved method and apparatus which overcomes the above-referenced problems and others.

SUMMARY OF THE INVENTION

In accordance with one aspect of the present invention, a mechanical actuating system is provided. A housing defines a polymer chamber, piston ports, and thermal medium ports. A volume of polymer is contained within the polymer chamber. A fluid passage extends between the ports. Pistons are disposed in the piston ports. Heat transfer fluid flows through the passage.

In accordance with another aspect of the present invention, a mechanical actuation system is provided. A liquid source provides warmer and cooler liquid to a plurality of actuators. Each actuator includes a housing body with fluid ports and a liquid flow path, an interior chamber, and a piston bore in fluid communication with the chamber. A piston is in the chamber. A phase change material is in the chamber, which expands and contracts as it changes phases. A controller controls the liquid source.

In accordance with another aspect of the present invention, a method of actuating is provided. A polymer is disposed in a sealed polymer chamber. The temperature of the polymer chamber is varied causing the polymer to expand and contract forcing a piston to stroke.

In accordance with another aspect of the present invention, a method of controlling a plurality of pistons in provided. Liquid is warmed and circulated to melt the polymer, and it is cooled and circulated to freeze the polymer.

According to another aspect of the present invention, a mechanical actuating device is provided. An outer housing defines a sealed polymer chamber, wherein is located an expansible polymer. A piston responds to expansion of the polymer. The polymer expands in response to a thermal carrier transferring heat into the polymer. A spring applies an opposing force to the force applied on the piston by the polymer.

According to another aspect of the present invention, a clamping system is provided. A mechanical actuator includes a piston received in a sliding relationship in a piston bore, a volume of polymer in a polymer chamber, and a heat transfer conduit through which heat transfer fluid flows, adding and removing heat from the polymer. The actuator is attached to a base. The base includes a clamping surface opposite the piston, and a means of securing the actuator in position. The base is secured to a stationary surface. A power supply supplies heat transfer fluid to the actuator. The power supply includes hot, cool, and warm fluid reservoirs, each reservoir holding a volume of the heat transfer fluid at different temperatures. The hot reservoir holds fluid that will melt the polymer, the cool reservoir holds fluid that will solidify he polymer, and the warm reservoir holds fluid that will keep the polymer melted once it is in a liquid state. The power supply also includes a pump for moving the transfer fluid.

According to another aspect of the present invention, a method of automated machining is provided. A mechanical actuator is secured to a base by an animated inorganic entity. Supply lines are attached to the actuator utilizing quick-connect fittings. A part is clamped between an extended piston of the actuator and a portion of the base by passing warmer heat transfer fluid through the actuator. Work is done on the clamped part by a second animated inorganic entity. The part is unclamped by passing cooler heat transfer fluid through the actuator.

One advantage of the present invention resides in hydraulic strength force clamping levels.

Another advantage resides in the elimination of possible oil discharge.

Another advantage is the circulation of only biologically safe fluids.

Another advantage resides in the elimination of high pressure circulation lines.

Another advantage resides in the reduction of the possibility of damage to supply lines by automated mills.

Another advantage resides in quick connection and disconnection of circulating fluids.

Another advantage resides in reduced factory downtime.

Another advantage resides in the enablement of arrays of multiple clamps.

Another advantage resides in user controllable clamping force levels.

Another advantage resides in more force for warmer temperatures.

Another advantage resides in less force for cooler temperatures.

Yet another advantage resides in the reduction of manual labor.

Still further benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
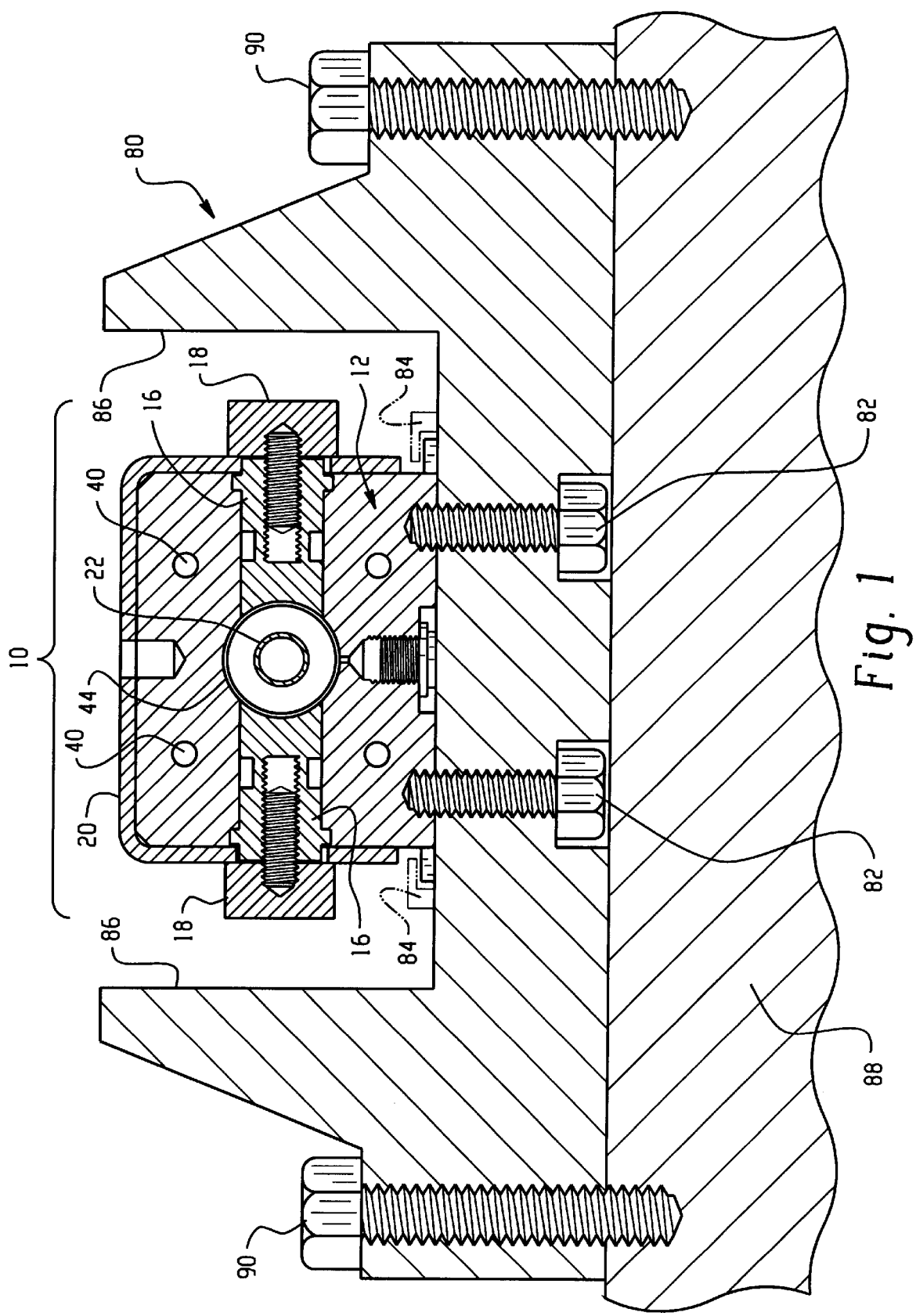
FIG. 1 is a longitudinal sectional view of a clamping device in accordance with the present invention.
Figure 2:
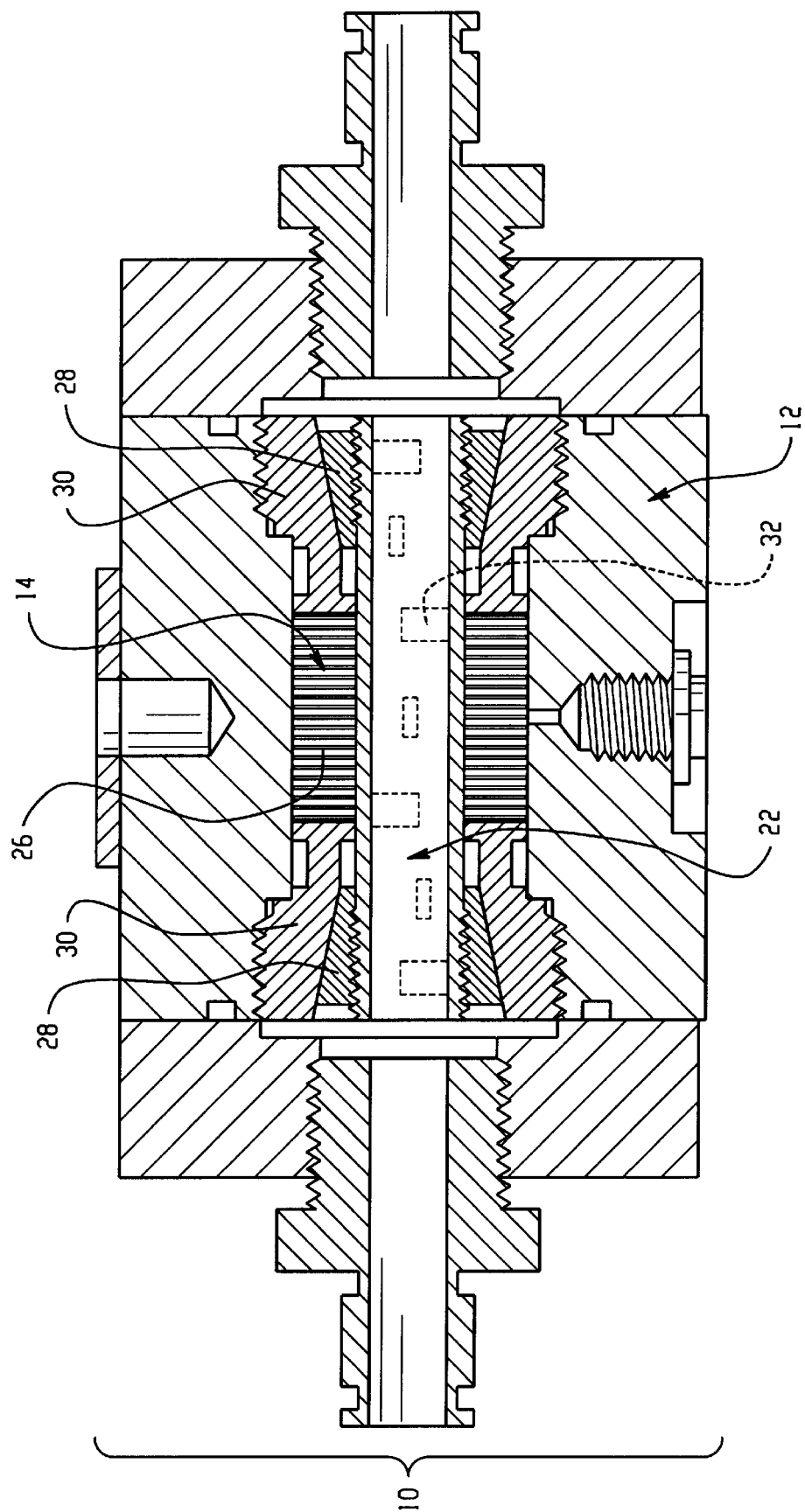
FIG. 2 is a transverse sectional view of the clamping device.

With reference to FIGS. 1 and 2, a mechanical clamp 10 has an outer housing or body 12 which defines an internal chamber 14. The internal chamber 14 is filled with a volume of polymer. In the preferred embodiment the polymer is chosen to have a melting (freezing) point relatively close to ambient room temperature, preferably above temperatures that commonly occur in the environment surrounding the clamps. For example, one preferred polymer is paraffin. When the polymer undergoes a liquid to solid phase transition, or the reverse thereof, it changes volume. The expansion when the polymer melts applies force on the surrounding housing 12 and a pair of actuation rods 16 such as pistons. As the polymer expands, it forces the pistons 16 to propagate outward along a longitudinal axis. The pistons are threadedly connected with interface elements 18 shaped and sized in accordance with the surface to be engaged. Alternately, the clamping force can be created by a mechanical spring and the piston is extended to compress the spring and drive the associated clamp open. If the piston 16 impinges upon a surface, such as a machine part, and the polymer is not fully expanded, pressure builds in the polymer chamber. This resultant pressure or clamping force is used to secure the surface in place. A return spring 20 biases the pistons 16 to withdraw as the polymer changes phases from a liquid to a solid.

To expand and contract the polymer, heat is added and removed. A thermally transmissive conduit 22 carries a thermal carrier 24 such as hot or cold liquid. In the preferred embodiment, the thermal carrier is a liquid that is benign to its surroundings, such as water, or water based cutting fluid. However, the thermal carrier is not limited to liquids, for example steam or other gases can be utilized as thermal carriers. To maximize heat transfer to and from the polymer, longitudinal or helical fins 26 are attached to the tubing to increase surface contact with the polymer. The vanes are oriented to facilitate polymer flow toward the pistons and back. The tubing itself could be wound into a helical or convoluted pattern to increase contact area with the polymer. Multiple tubes are also contemplated. In the preferred embodiment, the tubing material is one with high thermal conductivity, but is also structurally solid to withstand the high pressures developed without compressing and reducing piston force. Brass and copper alloys are preferred materials for constructing the conduit 22. The thermal tube 22 is threaded into opposing end fittings 28 which are cammed into a fluid sealing relationship with threaded end pieces 30 that define ends of the polymer chamber 14.

In order to eliminate laminar boundary layers within the heat transfer medium along the surface of the tube 22, fins 32 or other turbulence causing structures are disposed on the interior of the tube. The induced turbulence improves heat transfer to and from the polymer by promoting convection of the heat transfer fluid.

Many different polymers are available to be used in a clamping device. Based on the desired application, three criteria are considered. First is the melting temperature of the polymer. Its relation to the ambient temperature determines whether the polymer will naturally be in a solid or liquid state, hence in a contracted or expanded state, respectively. If the melt temperature is above the ambient temperature, then the polymer is naturally in a solid state, meaning the piston is withdrawn. The polymer is heated above ambient temperature to extend the piston. Consideration should also be given to maximum temperatures that occur in the environment. If the clamping temperature occurs in environmental conditions, the pistons may extend due to environmental rather than controlled factors.

Another option is to choose a polymer that is in the liquid state at ambient temperature. This embodiment presents a clamp that is closed at ambient temperature, and is cooled to effect a release of the clamp. A benefit of this embodiment is that once the clamp 10 is closed, it can be removed from the heat transfer fluid circulation system, and remain closed. This can ensure that positioning of the clamped material remains constant across multiple machining devices.

A second factor in choosing the polymer involves expansion and compressibility characteristics. These characteristics describe how the volume of the polymer behaves as the pressure changes. By examining these characteristics, a stroke, that is, an amount of displacement of the piston 16, is determined, along with maximum clamping forces of the clamp 10.

A third factor in consideration of the polymer is its viscosity. Knowing the viscosity of the polymer in its liquid state facilitates design of the polymer chamber 14 and the heat transfer tube. By designing for viscosity, the clamp becomes more predictable in closure times, pressure gradients, and maximum clamping forces.

Figure 3:
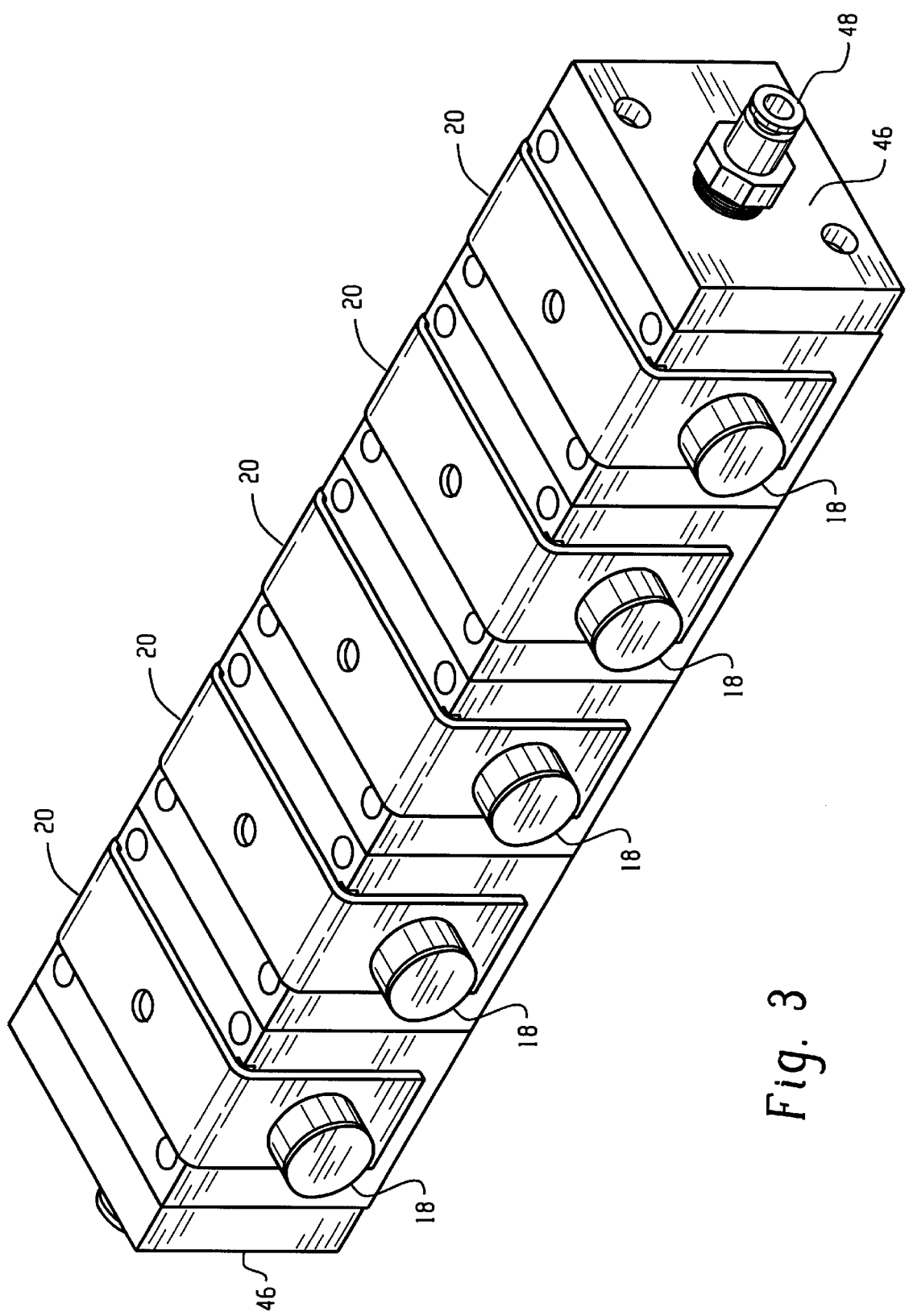
FIG. 3 is an array of clamping devices in accordance with the present invention.
Figure 4:
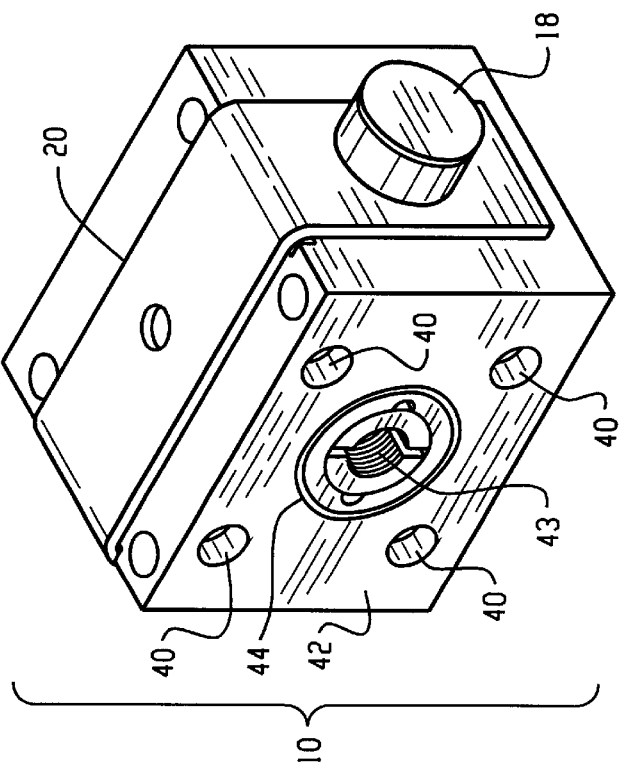
FIG. 4 is a perspective view of the clamping device.

With reference to FIG. 3, multiple clamping devices 10 can be connected together. This forms a clamping line that can secure a part with a much greater dimension, or multiple parts against a common, stationary surface. In this type of arrangement, the heat transfer fluid flows through each of the clamping devices 10 before returning to its source. The heat transfer tubes 22 of each clamping device 10 are interconnected to form a continuous path. With reference to FIGS. 1 and 4, the bodies 12 define bores 40 which receive dowels, rods, individual threaded connectors, or the like to align and connect multiple devices. Preferably, the bores 40 are alternatingly threaded to receive bolts or dowel rods, for clamping adjacent devices 10 together. Each of the clamp modules 10 has flat side faces 42 that are clamped together in a fluid tight seal around a thermal medium port 43 in which the threaded end pieces 30 are received. Optionally, a groove or other gasket locating structure 44 it. holds a gasket that promotes fluid sealing around the thermal medium port. Polymeric or soft metal washers can be received in the thermal medium port 43 that receives end pieces 30 and clamped into fluid sealing contact between adjoining end piece faces to promote sealing.

Figure 5:
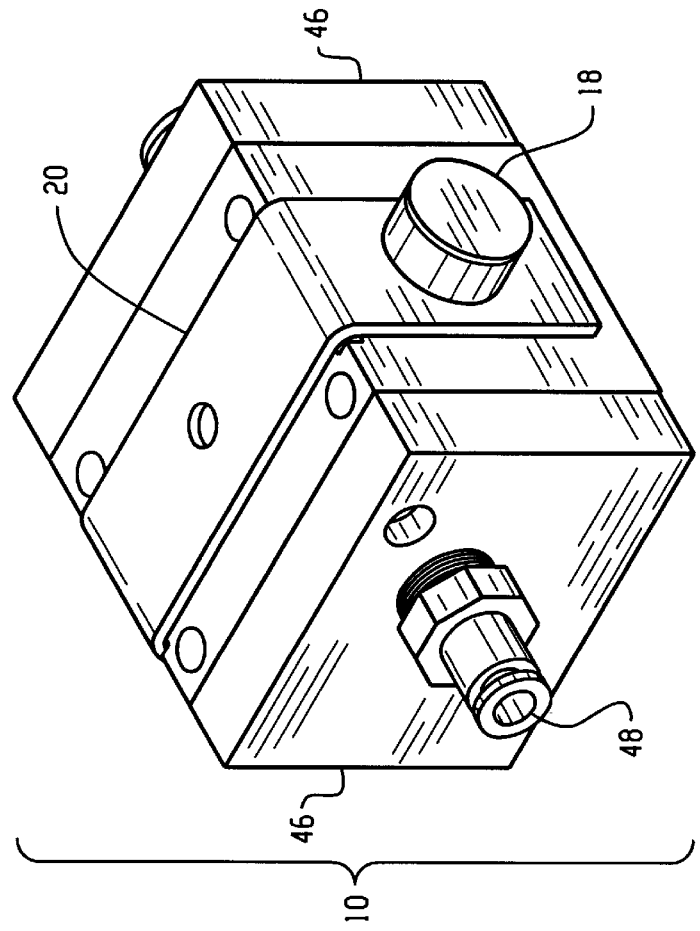
FIG. 5 is a perspective view of the clamping device with attached end pieces and fittings, in accordance with the present invention.

With reference to FIGS. 2, 3, and 5, end pieces 46 are clamped to the first and last clamping devices 10 in a line. The end pieces 46 are tapped to receive fittings 48 which are configured to connect quickly with various hoses and tubes that carry the heat transfer fluid.

Figure 6:
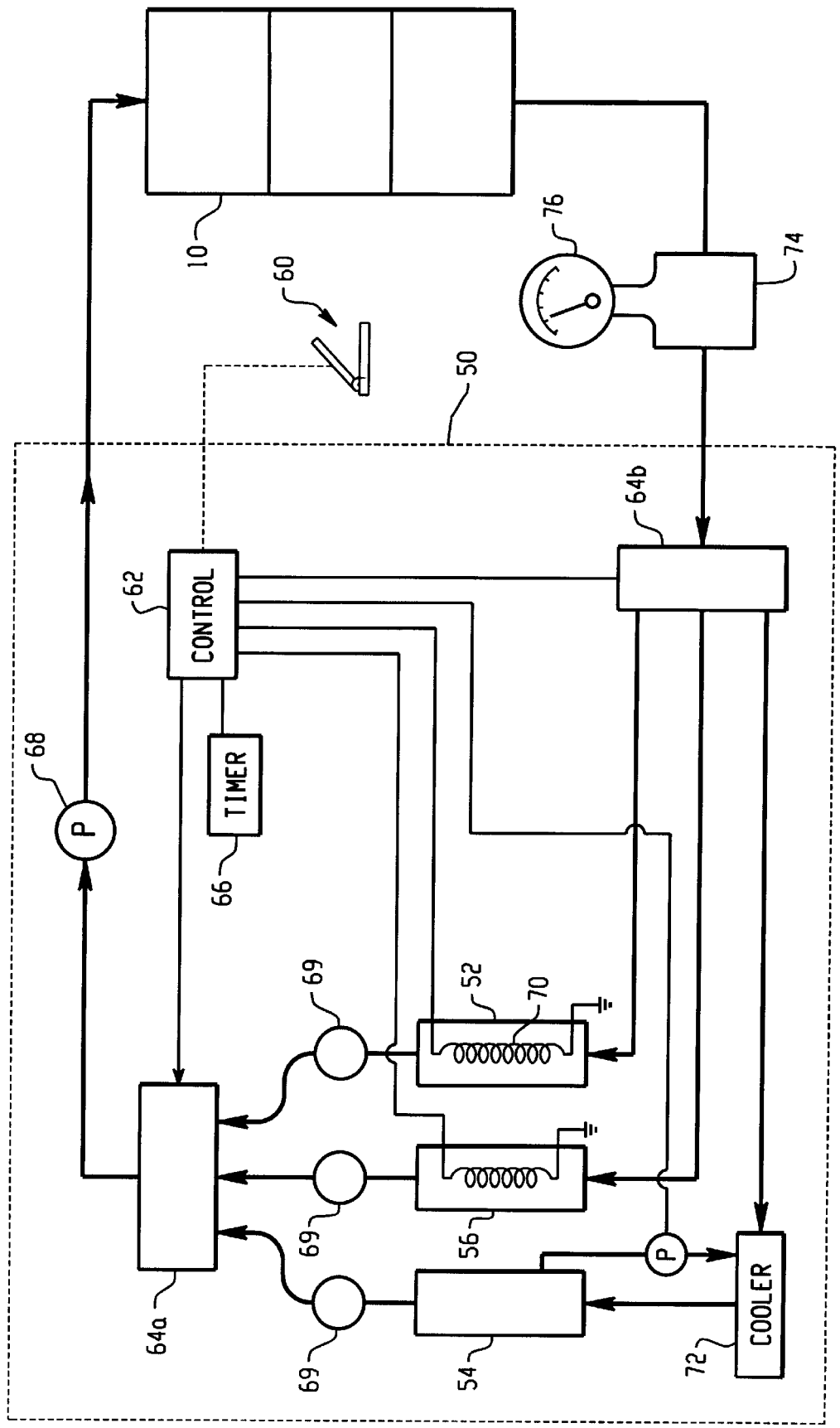
FIG. 6 is a flow diagram of one or more clamping devices and an associated power supply, in accordance with the present invention.

In the preferred embodiment, and with reference to FIG. 6, a clamping device 10 or array of clamping devices are connected to a heat transfer system 50. The heat transfer system 50 includes a hot fluid reservoir 52 and a cold fluid reservoir 54. Optionally, a warm fluid reservoir 56 is also included. Hot, cold, and warm are relative to the melting point of the polymer. The hot fluid reservoir 52 contains fluid at a temperature sufficiently greater than the melting point of the polymer to melt it quickly. The cold fluid reservoir 54 contains fluid at a temperature sufficiently less than the melting point of the polymer to solidify it within a preselected time. The warm fluid reservoir 56 contains fluid at or slightly above the melt temperature of the polymer. Fluid from the warm fluid reservoir 56 is used to hold the polymer in its melted state. The warm reservoir can be used to melt the polymer, but the warm fluid melts the polymer more slowly. Optionally, a fourth reservoir can have liquid just below the melt temperature to hold the polymer close to its phase change temperature for faster actuation response.

When actuation of the device is desired, fluid is drawn from the hot fluid reservoir through the device, rapidly changing the temperature of the polymer. Once the polymer has changed phase, or after a preset time period, fluid flow is switched from the hot fluid reservoir to the warm fluid reservoir.

For example, given a polymer with a melting point of 46° Celsius, the hot and cold reservoirs 52, 54 are preferably 82° and 21° respectively. The warm reservoir 56 is preferably 49°, warm enough to keep the polymer melted, even in the presence of thermal losses in the system. In the preferred embodiment, the hot fluid reservoir 52 is not held above 82° for safety reasons.

Should a supply line be accidentally cut, scalding might occur if the fluid is too hot. The previous example is that of a polymer with a melting point above most ambient room temperatures. In another example, the melting point is below ambient temperatures, for example, 16° Celsius.

The temperatures of the fluid reservoirs would be shifted appropriately as per the needs of the application.

In the preferred embodiment, the heat transfer fluid is safe, non-toxic, and non-contaminative should it leak. Water is an ideal heat transfer fluid. Other fluids of particular interest are water based cutting fluids and electrical discharge machining (EDM) fluids. Certain criteria are considered in choosing the heat transfer fluid. First, the heat capacity and how well the fluid conducts heat is considered. The fluid is desired to easily store and give up heat, making clamping and unclamping of the clamping devices 10 faster processes. Environmentally friendly fluids are preferred. Fluids that do not contaminate other fluids being used are preferred. For instance, some cutting fluids and-EDM fluids are easily contaminated by hydraulic oil. Instead of using an oil as the heat transfer fluid, the same cutting fluid or EDM fluid is used.

Another temperature consideration addressed when choosing the heat transfer fluid is whether the fluid remains in its liquid state at both the hot and cold reservoir temperatures. In the preferred embodiment, the heat transfer fluid is circulated at a relatively low pressure, about 275 kPa (about 40 psi). This minimizes spraying should circulation hoses develop leaks. Moreover, it is the temperature and heat capacity of the fluid that primarily affects the polymer rather than the pressure. The preferred embodiment of the clamping system can effectively be maintained and actuated with a loss of 50% of the transfer fluid pressure.

With further reference to FIG. 6, An operator manipulates a control 60, such as a foot pedal which is connected with control electronics 62. In one preferred embodiment, the operator controls the valves remotely with an RF, infrared, or other remote device, allowing distance between himself and mill components. The controller controls output valves 64a and input valves 64b to send hot water to actuate the clamps 10, then warm water to maintain actuation. A timer 66 causes the controller to switch the valves from the hot water reservoir to the warm water reservoir after a preselected duration. A pump 68 provides the fluid with motive force to travel from the reservoirs, to the clamping devices 10, and back. Filters 69 are disposed between the reservoirs and the outgoing valves 64a to cleanse the heat transfer fluid of impurities before it is circulated to the clamping devices 10.

In order to keep the hot and cold reservoirs 52, 54 at temperature, the heat transfer subsystem 30 includes at least one heater 70 and at least one cooler system 72. In the preferred embodiment, the heater 70 heats transfer fluid returning to the hot fluid reservoir 52 from the clamping devices 10 as well as sedentary fluid directly from the hot fluid reservoir 52. This ensures that the hot fluid reservoir is held at the appropriate temperature. Similarly, the cooler system 72 removes heat from fluid returning from the clamping devices 10 to the cold fluid reservoir 54. The exact type of cooling system depends on the desired temperature of the cold reservoir 54. If the cold reservoir is to be held close to room temperature, then a fan and a simple heat exchanger is preferred. For colder temperatures, more complex refrigeration systems are preferred.

In order to lessen heat pollution from one reservoir to another, a heat sensor 74 is disposed on a return path to the reservoirs 52, 54, 56 before the return valve 64b. The heat sensor measures when the temperature of the heat transfer fluid changes. The control electronics 62 causes the valve 64b to direct the fluid to the most appropriate reservoir. When the sensor 74 senses the hot fluid returning from the devices 10, the controller causes the valves 64b to return the fluid to the hot fluid reservoir. The controller switches flow from the hot fluid reservoir 52 to the warm fluid reservoir 56. For a time, the sensor 74 still senses hot fluid, and returns it to the hot fluid reservoir 52 until arm fluid is detected by the sensor 74. Of course, if he warm fluid reservoir is too cool, the hot return fluid an be used to warm it.

Figure 7A:
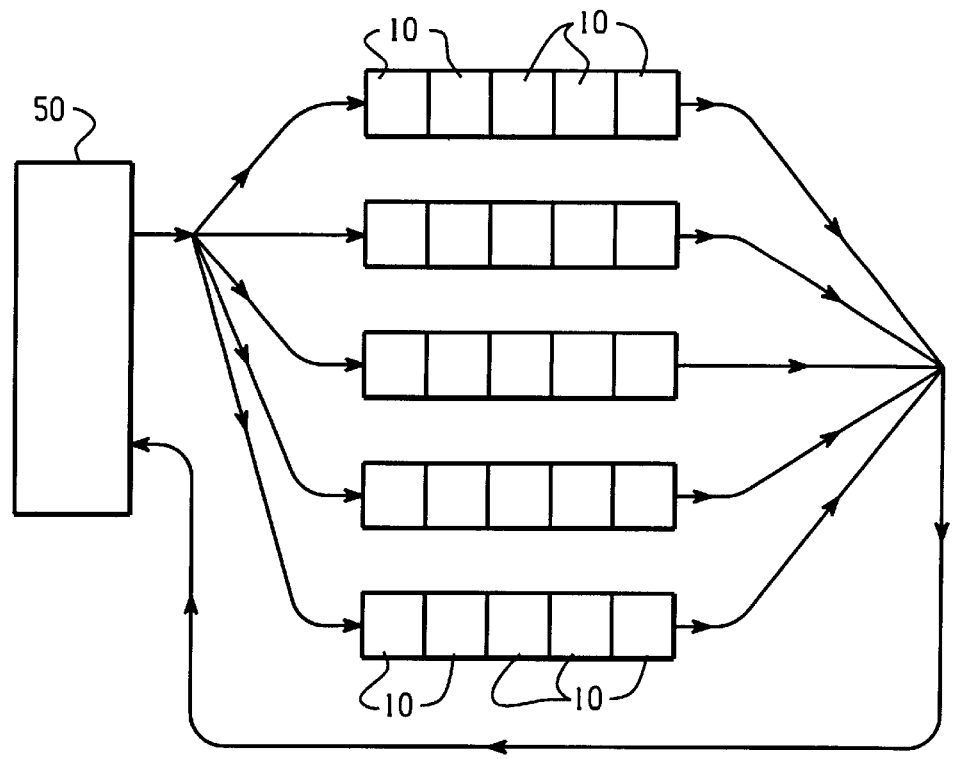
FIG. 7A is a parallel combination of several chains of clamping devices, in accordance with the present invention.
Figure 7B:
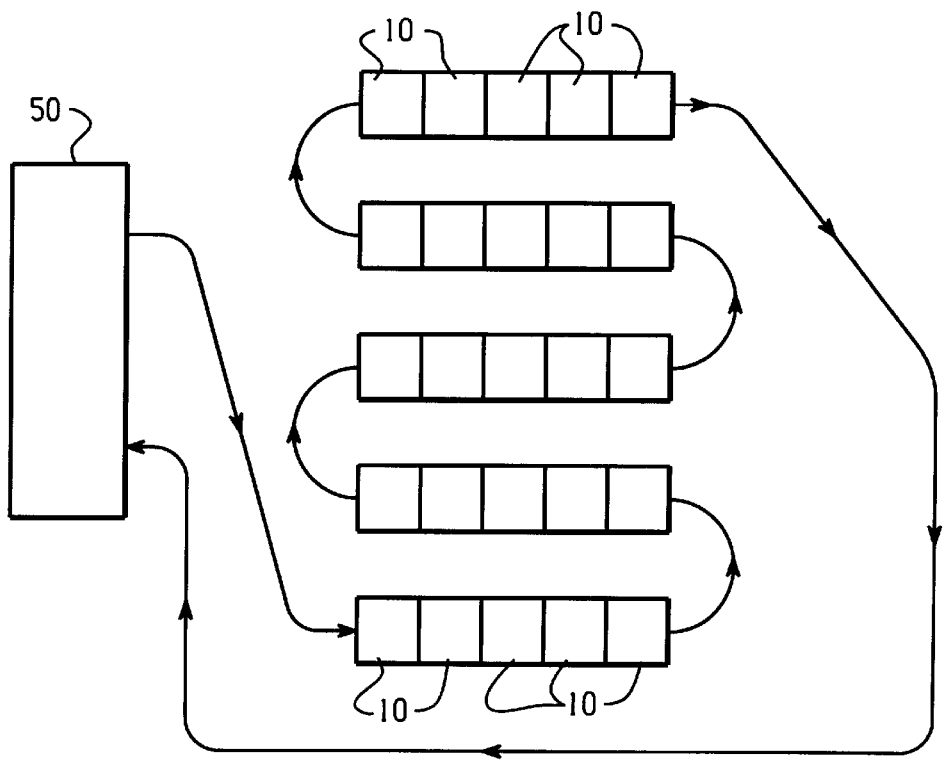
FIG. 7B is a series combination of the chains of clamping devices.

In FIG. 7A, the clamping devices are arranged in a parallel combination; and in FIG. 7B, a series combination is illustrated. Depending on the application, the number of clamping devices in a chain, and other factors, one arrangement might be preferred over another. For example, The parallel lines can be controlled individually to actuate the sets of clamps sequentially. The parallel arrangement has less temperature drop across each line of clamp modules, but has a greater pressure/flow speed drop that can affect heat transfer rates.

For maintaining safety of a commercial product, the preferred embodiment includes various safety features. One is a temperature sensor. A warning indicator 76 actuates if a fluid reservoir strays from a preset temperature range, especially if it presents a possibly for unscheduled unclamping of the devices. Such a temperature deviation could indicate a problem with heating and/or cooling elements. Another sensor is concerned with the water level of the reservoirs. If the reservoirs become depleted (e.g. because of a cut supply line) a warning signal warns the operator so appropriate measures can be taken to avoid unwanted actuation or deactuation of the devices. Additionally, safety indicators and alarms can be used to indicate when a device reaches a preset clamping force, or the like. Optionally, pressure gauges give a visual readout of the instantaneous pressure.

In an alternate embodiment, only one supply is utilized. A flash heater is used to heat the transfer fluid to desired temperatures. This embodiment is most compatible with an open system (e.g. a tap water feed to a drain).

With reference again to FIG. 1, the actuator 10 is secured to a clamping base 80 with actuator securing bolts 82. Alternately, lever release securing clamps 84 could be used to secure the actuator 10 to the base, as ghosted in FIG. 1. A lever release is preferable in a fully automated setting in which a robot can release a plurality of actuators 10 and reposition them with a relatively simple range of motions. In the preferred embodiment, the base 80 provides a platform for securing the actuators 10 as well as clamping surfaces 86 opposite the piston caps 18. In operation, a piece to be clamped is inserted in a gap between the piston cap 18 and the clamping surface 86. The piston actuates, pressing the piece against the clamping surface 86, securing it in place while the piston 16 is actuated. The base 80 is secured to a table 88 or other stationary platform with base securing bolts 90.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A mechanical actuating system comprising:
   a plurality of modules, each module including:
      a housing that defines:
         a polymer chamber,
         at least one piston port,
         a pair of parallel side faces,
         a pair of thermal medium ports, one thermal medium port defined in each of the parallel faces in alignment with each other,
         bores through the side faces and the housing for receiving mechanical elements that clamp side faces of adjoining modules together in a fluid-tight relationship to gang a plurality of modules together to operate concurrently;
      a volume of polymer which undergoes phase changes disposed in each polymer chamber;
      a fluid passage extending between the thermal medium ports through the polymer chamber of each housing;
      at least one piston disposed in the piston port of each housing to be moved by expansion of the polymer; and,
      a heat transfer fluid that flows serially through the fluid passages of modules that are ganged together.

2. The mechanical actuating system as set forth in claim 1, wherein the heat transfer fluid is common to the outside environment.

3. The mechanical actuating system as set forth in claim 1, further including:
   a first reservoir of the heat transfer fluid maintained at a temperature greater than a phase change temperature of the polymer; and,
   a second reservoir of the heat transfer fluid maintained at a temperature less than the phase change temperature.

4. The mechanical actuating system as set forth in claim 3, further including:
   a set of valves that controls from which reservoir fluid is being drawn and to which reservoir fluid is being returned; and,
   a pump that circulates the fluid from the selected reservoir through the fluid passage and back to the reservoirs.

5. A mechanical actuating system comprising:
   a plurality of actuator modules, each module including:
      a housing that defines a polymer chamber and at least one piston port,
      a volume of polymer which undergoes phase changes disposed in the polymer chamber,
      a fluid passage extending through the polymer chamber,
      at least one piston disposed in the piston port that is moved by expansion of the polymer;
   a first reservoir which maintains a heat transfer fluid at a temperature greater than a phase change temperature of the polymer;
   a second reservoir which maintains the heat transfer fluid at a temperature less than the phase change temperature;
   valves that control from which reservoir the heat transfer fluid is being drawn, through which modules the drawn heat transfer fluid is circulated, and to which reservoir the heat transfer fluid is being returned;

a pump that circulates the fluid from the selected reservoir through the fluid passage of the selected module and back to the reservoirs;

an operator input device for controlling the valves.

6. The mechanical actuating system as set forth in claim 5, further including:

a heater for maintaining the first reservoir at the temperature greater than the phase change temperature; and, a cooler for maintaining the second reservoir at the temperature less than the phase change temperature.

7. A mechanical actuating system comprising:

a housing that defines a polymer chamber;

a volume of polymer which undergoes phase changes disposed in the polymer chamber;

a fluid passage extending through the polymer chamber;

at least one piston disposed in communication with the polymer chamber to be moved by expansion of the polymer;

a heat transfer fluid that flows through the fluid passage;

a first reservoir containing the heat transfer fluid maintained at a temperature greater than a phase change temperature of the polymer;

a second reservoir containing the heat transfer fluid maintained at a temperature less than the phase change temperature; and a third reservoir, the third reservoir containing the heat transfer fluid maintained at a temperature slightly greater than the phase change temperature and less than the temperature of the first reservoir.

8. The mechanical actuating system as set forth in claim 1, further including:

a plurality of return springs, each return spring urging one of the pistons to retract.

9. The mechanical actuating system as set forth in claim 1, further including:

structures within each of the flow passages to disrupt laminar flow patterns within the fluid passage.

10. A mechanical actuation system comprising:

a liquid source which supplies hotter, warmer, and cooler liquid;

a plurality of mechanical actuators connected with the liquid source to receive hotter, warmer, and cooler liquid therefrom, each actuator including:

a housing body having (i) a pair of thermal fluid ports with a liquid flow path therebetween, (ii) an interior chamber adjacent the liquid flow path, and at least one piston bore in fluid communication with the interior chamber;

a piston received in a slidable relationship in the chamber;

a phase change material disposed in the chamber, the-phase change material expanding and changing to a liquid phase with heat and contracting and changing to a solid phase with cooling;

a controller which controls the liquid source to (i) supply the hotter liquid to the actuators melting the phase change material and extending the piston, (ii) supply the warmer liquid to the actuators to maintain the phase change material melted and the piston extended, and (iii) supply the cooler liquid to the actuators solidifying the phase change material and allowing the piston to retract.

11. A mechanical actuation system comprising:

a plurality of mechanical actuator modules connected together to operate concurrently, each actuator module including:

a housing body having (i) a pair of thermal fluid ports with a fluid flow path therebetween, (ii) an interior chamber adjacent the liquid flow path, (iii) mating sealing surfaces surrounding each thermal fluid port, and (iv) at least one piston bore in fluid communication with the interior chamber;

a piston received in a slidable relationship in the chamber;

a phase change material disposed in the chamber, the phase change material expanding and changing to a liquid phase with heat and contracting and changing to a solid phase with cooling;

a mechanical connector which connects at least two actuator modules together, side-by-side with the mating sealing surfaces in a fluid sealing relationship, such that fluids flow serially through the flow paths of the connected actuator modules;

a controller which controls a fluid source to (i) supply a hotter fluid serially through the flow paths of the connected actuator modules melting the phase change material and extending their pistons concurrently and (ii) supply the cooler liquid through the flow paths of the connected actuator modules solidifying the phase change material and allowing the pistons to react concurrently.

12. The system as set forth in claim 11, wherein:

the mating sealing surfaces are on opposite faces of the actuator modules and a plurality of the actuator modules are connected, side-by-side in a line.

13. The system as set forth in claim 11, further including:

an end plate having a sealing surface on one face that mates with the mating sealing surface of one of the actuator modules and a quick connect fitting on another face in fluid communication with the fluid flow path;

a mechanical connector means for connecting the end plate to the housing body.

14. The system as set forth in claim 10, wherein the housing body defines two oppositely disposed piston bores, the piston received in a slidable relationship in one bore and a second piston received in a slidable relationship in the other bore, and further including:

a U-shaped spring which extends around the housing and biases the two pistons concurrently to retract.

15. The system as set forth in claim 10, wherein the liquid source includes:

a cooler liquid reservoir a cooler which maintains the liquid in the cooler liquid reservoir below a phase change temperature at which the phase change material melts;

a warmer liquid reservoir;

a first heater which maintains the liquid in the warmer liquid reservoir above the phase change temperature;

a hotter liquid reservoir;

a second heater which maintains the liquid in the hotter fluid reservoir hotter than the liquid in the warmer liquid reservoir;

a pump system which circulates the liquid from the reservoirs to the actuators and back.

16. The system as set forth in claim 10, wherein the controller includes:

a timer for supplying the hotter liquid to the actuators for more rapid actuation and after a time commensurate with a time for the phase change material to melt, supplying the warmer liquid to the actuators to maintain the phase change material melted.

17. A system for holding items stationary during machining which use a cutting fluid the system comprising:
a plurality of mechanical actuators, each actuator including:
a housing body having (i) an interior chamber; (ii) a liquid flow path through the interior chamber; and (iii) at least one piston bore in fluid communication with the interior chamber;
a piston received in a slidable relationship in the chamber;
a phase change material disposed in the chamber, the phase change material (i) changing phase and expanding when heated relative to a phase change temperature and (ii) changing phase and contracting when cooled relative to the phase change temperature;
a liquid source which supplies the cutting fluid (i) at a temperature above a phase change temperature to expand the polymer and (ii) below the phase change temperature to contract the polymer.

18. A method of controlling a mechanical element which is extended by polymer expanding in polymer chamber as the polymer is heated above a phase change point, the method including:
maintaining the liquid in a first reservoir at the temperature below the phase change point;
maintaining the liquid in a second reservoir at the temperature above the phase change of the polymer;
maintaining the liquid in a third reservoir at a temperature greater than the phase change point and less than the temperature of the liquid in the second reservoir;
circulating the liquid from the second chamber through the polymer chamber to melt the polymer;
after circulating the liquid from the second reservoir through the polymer chamber to melt the polymer, circulating the liquid from the third reservoir to maintain the polymer above the melting point;
circulating the liquid from the first chamber through the polymer chamber to contract the polymer.

19. A method of controlling a plurality of pistons which are extended by polymer expanding in polymer chambers as the polymer is heated above a melting point, the method including:
circulating a liquid warmed above the melting point through linear tubes each extending centrally through one of the polymer chambers to melt the surrounding polymer;
disrupting a laminar boundary layer of the liquid as the liquid flows through the linear tubes to improve a flow of warmed liquid adjacent surfaces of the linear tube adjacent the polymer chambers;
circulating the liquid cooled below the melting point through the linear tubes in the polymer chambers to solidify the polymer.

20. A method of controlling a plurality of pistons which are extended by polymer expanding in polymer chambers as the polymer is heated above a melting point, the method including:
connecting a plurality of like sealed polymer chambers side-by-side with internal fluid carrying paths connected in series;
circulating a fluid warmed above the melting point through the series connected fluid carrying paths to melt the polymer extending the pistons of each of the side-by-side connected chambers concurrently;
circulating the fluid cooled below the melting point through the series connected fluid carrying paths to solidify the polymer and allow the pistons to be retracted concurrently.

21. The method as set forth in claim 18, further including:
retracting the piston with a spring as the polymer contracts.

22. A plurality of mechanical actuating modules ganged together to operate concurrently, each module including:
at least one end plate having a sealing face sealed to the flat side of an end one of the connected modules, the end plate carrying a fitting for connecting a fluid heat transfer network to the aligned flow paths;
an outer housing defining a sealed chamber in which an expansible polymer is disposed, the housing having flat parallel sides which mate to the flat side of an adjoining module in a sealing relationship;
a piston that moves with expansion of the polymer;
a flow path that extends between the flat sides and through the sealed chamber in thermal contact with the polymer; and,
a spring that applies an opposing force to a force resulting from expansion of the polymer;
a means for clamping the flat sides of the plurality of modules together with thereflow paths in alignment.

23. The mechanical actuating device as set forth in claim 22, further including:
a plurality of axial bores extending through the parallel sides, the housings, and the at least one end plate for receiving dowels, facilitating connection of the plurality of modules.

24. The mechanical actuating device as set forth in claim 22, further including:
a piston cap attached to the piston customized to secure a part with a facing geometry other than flat with respect to the piston.

25. A clamping system comprising:
at least one mechanical actuator which includes:
at least one piston received in a slidable relationship in a piston bore;
a volume of expansible polymer disposed in a sealed polymer chamber, the expansion of the polymer causing an advancement of the piston along the bore;
a heat transfer conduit that is thermally conductive with the polymer, through which a heat transfer fluid flows adding and removing heat from the polymer;
a base to which the mechanical actuator is attached, securing the actuator in a stationary position relative to the base, the base including:
at least one clamping surface opposite the at least one piston;
a means of securing the mechanical actuator;
a stationary surface to which the base is secured;
a power supply for supplying the heat transfer fluid to the at least one actuator, the power supply including:
a hot fluid reservoir containing the heat transfer fluid held at a temperature greater than a melting point of the polymer;
a cool fluid reservoir containing the heat transfer fluid held at a temperature less than the melting point of the polymer;
a warm fluid reservoir containing the heat transfer fluid held at a temperature greater than the melting point of the polymer, and less than the temperature of the fluid held in the hot fluid reservoir;

a pump for circulating the heat transfer fluid from the reservoirs to the at least one actuator and back.

26. A method of automated machining comprising:

securing at least one mechanical actuator to each of a plurality of bases, each actuator including quick-connect end fittings;

attaching heat transfer fluid supply lines to the end fittings of each actuator;

supplying hotter heat transfer fluid to the actuators attached to a first of the bases independent of supplying heat transfer fluid to the actuators attached to other bases clamping a part between a portion of the actuator and a portion of the first base;

machining the part;

unclamping the part by supplying heat transfer fluid cooler than the heat transfer fluid in the clamping step through the at least one actuator attached to the first base;

clamping and unclamping parts in the other bases independent of the clamping and unclamping of parts on the first base by independently supplying the hotter and cooler heat transfer fluid from a common supply.

27. A clamping system comprising:

a plurality of mechanical actuators each of which includes:

at least one piston received in a slidable relationship in a piston bore;

a volume of expansible polymer disposed in a sealed polymer chamber, the expansion of the polymer causing an advancement of the piston along the bore;

a heat transfer conduit that is thermally conductive with the polymer, through which a heat transfer fluid flows adding and removing heat from the polymer;

a plurality of bases to each of which at least one of the mechanical actuator is attached, securing the actuator in a stationary position relative to the base, the base including:

at least one clamping surface opposite the at least one piston;

a means of securing the mechanical actuator;

a reference surface to which the base is secured;

a power supply for supplying the heat transfer fluid to the plurality of actuators, the power supply including:

a hot fluid reservoir containing the heat transfer fluid held at a temperature greater than a melting point of the polymer;

a cool fluid reservoir containing the heat transfer fluid held at a temperature less than the melting point of the polymer;

a plurality of fluid flow controllers for controlling the supplying of the heat transfer fluid from the reservoirs to the actuators attached to each base independently of actuators attached to other bases.

* * * * *